United States Patent Office 2,733,272
Patented Jan. 31, 1956

2,733,272

TRIHYDROXY POLYOXYALKYLENE ETHERS OF GLYCEROL

Lee H. Horsley and Edgar C. Britton, Midland, Mich., assignors to The Dow Chemical Company, Midland, Mich., a corporation of Delaware No Drawing. Application October 27, 1950, Serial No. 192,603

7 Claims. (Cl. 260—615)

This invention relates to mixtures of trihydroxy polyoxyalkylene ethers of glycerol and to a method of making them.

There are now available commercially complex mixtures of long-chain polyoxyalkylene compounds prepared by the condensation of alkylene oxides, e. g. ethylene oxide, propylene oxide, or mixtures of them, with monohydric alcohols. These mixtures exhibit lubricating properties and have also been recommended as components of hydraulic brake fluids. Used without dilution as lubricants, they have a very desirably small change in viscosity with temperature. Curiously, however, this property is largely masked when the mixtures are made into hydraulic brake fluids by blending with other liquids conventional for the purpose. Further, the mixtures have only limited compatibility with such other ingredients, so that brake fluids so compounded tend to separate into two phases at low temperatures and also to have low water tolerance. For these reasons, the mixtures have not provided a complete solution to the longstanding problem of formulating an all-purpose hydraulic brake fluid.

Related materials are the condensation products of glycerol with a single olefin oxide. These materials are likewise of limited usefulness in formulating brake fluids because of poor viscosity characteristics, waxiness, and low water tolerance.

It is therefore an object of this invention to provide new mixtures of polyoxyalkylene compounds which have only small change of viscosity with temperature and which retain this property when diluted with conventional brake fluid components even at the lowest service temperatures and which impart excellent water tolerance to the compounded fluids.

These objects are realized in the present invention by certain new highly complex mixtures of trihydroxy polyoxyalkylene ethers of glycerol. Specifically, the new mixtures are those preparable by the condensation of glycerol with mixtures of ethylene oxide and propylene oxide in which the ethylene oxide represents from 20 to 80 mol per cent of the oxide mixture, the condensation being carried to a stage such that there are an average of at least 8 oxyalkylene groups per glycerol nucleus. Higher degrees of condensation, from 15 or 20 oxyalkylene groups up to 300 or more per glycerol nucleus, are preferred.

In making the new mixtures, glycerol is mixed with a suitable condensation catalyst, usually an alkali metal hydroxide, and heated to a reaction temperature in a closed vessel. A mixture of ethylene oxide and propylene oxide in predetermined proportions is then introduced gradually into the vessel over a period of several hours until condensation has progressed to the desired extent. The catalyst is then removed by neutralization, after which the reaction mixture is heated under reduced pressure to drive off volatile matter, leaving a product according to the invention.

The reaction which occurs in the process appears to be first an addition of ethylene oxide and propylene oxide molecules to the glycerol molecule, forming oxyalkyl groups on the glycerol nucleus. There follows addition of more oxide molecules to each of the oxyalkyl groups, producing polyoxyalkylene chains. Since the rates of condensation of ethylene oxide and of propylene oxide are nearly the same, molecules of each apparently add to the growing nuclei in entirely random fashion. The final product is thus an extremely complex mixture of glyceryl ethers having polyoxyalkylene chains of different lengths and different internal configurations, with a free hydroxyl group at the end of each of the polyoxyalkylene chains, the glycerol nucleus being at the other end. In other words, the individual molecules on the average contain both the oxyethylene and the oxy-1,2-propylene groups distributed quite at random in the oxyalkylene chains. The products of the invention may thus be referred to as mixtures of trihydroxy mixed poly(oxyethylene oxy-1,2-propylene) ethers of glycerol, the term "mixed" indicating that the oxyethylene and oxy-1,2-propylene groups vary randomly in position from molecule to molecule.

These mixtures are all colorless to amber virtually non-volatile liquids having very low pour-points and exceptional miscibility with a wide variety of organic compounds and with water. They are also characterized by a low rate of change of viscosity with change in temperature, even when diluted with other liquids. In addition, they are stable in air, do not deposit gummy residues on heating, and are not corrosive toward metals. These properties, as previously explained, render them especially valuable as components of hydraulic brake fluids. However, they are also useful as lubricants for machinery, as blending and thickening agents for aqueous and non-aqueous media, and in textile treatment. Unlike related materials, they also have such low oral toxicity and such low skin absorptivity as to be valuable ingredients of cosmetic preparations. Within the limits of the invention, the viscosities and other properties of the new products can be varied to suit particular end uses by controlling the ratio of ethylene oxide to propylene oxide employed in their manufacture and the molecular weight, i. e. the extent of condensation.

The minimum molecular weight at which the advantageous properties of the new products begin to be obtained corresponds to the condensation of about 8 mols of alkylene oxides per mol of glycerol. In the case of an equimolecular mixture of ethylene oxide and propylene oxide this minimum molecular weight is about 500. However, minimum molecular weight does not necessarily produce a mixture of minimum viscosity. For instance, the viscosity of the condensate with equimolecular proportions of ethylene oxide and propylene oxide, as measured at 100° F., tends to decrease as the lengths of the oxyalkylene chains increase until a molecular ratio of from 15 to 20 oxyalkylene groups per glycerol molecule is reached, corresponding to a molecular weight of 850 to 1100. At about this value, minimum viscosity is reached. Further increase in molecular weight increases the viscosity of the product in nearly linear proportion, at least until a molecular ratio of 200 to 300 oxyalkylene groups per glycerol molecule is reached.

Somewhat in contrast to this behavior is the effect of increasing molecular weight on the change of viscosity with temperature, as measured by the ratio of the viscosity at 100° F. to that at 210° F. This viscosity ratio declines with increasing molecular size until a ratio of about 50 mols of alkylene oxide per mol of glycerol is reached, after which it remains virtually constant up to a molecular ratio of 300:1 or more.

The molecular ratio of ethylene oxide to propylene oxide used in the condensation has comparatively little effect on the viscosity and the viscosity-temperature behavior of the products, at least within the limits of the invention. There is only a slight increase in viscosity as higher proportions of ethylene oxide are used. However, this oxide ratio has a marked effect on other properties. Thus, the water tolerance of the product falls as the proportion of propylene oxide increases. On the other hand, the pour-point and waxiness rise with increasing ethylene oxide content. Optimum oxide ratios are in the range of 0.5 to 1.5 mols of ethylene oxide per mol of propylene oxide, with a 1:1 ratio being in general most satisfactory.

The water tolerance of the products also tends to decrease somewhat with increasing molecular weight, through with most ethylene oxide-propylene oxide ratios undesirable values do not appear to be encountered even at the maximum molecular weight of 5000 to 6000 realizable in ordinary practice.

In making the products of the invention, it is preferred that the starting materials contain as little water as possible in order to avoid undesirable side-reactions. However, extreme precautions are not required. Commercial glycerine, containing at least 95 per cent glycerol, and ethylene oxide and propylene oxide of ordinary commercial purity, containing from 0.1 to 0.2 per cent water, are satisfactory.

The catalyst employed in the condensation may be any of those known for the condensation of olefin oxides with alcohols. Alkaline catalysts, especially alkali metal hydroxides or alkali metal alcoholates, are best, with potassium hydroxide being preferred. The proportion of catalyst is ordinarily quite small, from 0.1 to 1.0 per cent by weight of the total reactants, usually 0.2 to 0.4 per cent being adequate. For convenience, the catalyst is dissolved in the glycerol before condensation begins. More catalyst can be added in the closing stages of any condensation which tends to become sluggish.

The reaction of glycerol and ethylene oxide-propylene oxide mixture is easily carried out batchwise in a stirring autoclave under moderate pressure. The autoclave should have provision for both heating and cooling the contents, and is advantageously swept out with an inert gas, such as nitrogen, before reaction to eliminate the mildly adverse effect of air and to minimize explosion hazards.

The temperature at which the condensation proceeds is fairly critical and should be in the range between about 100° C. and about 140° C. In most instances, a temperature of at least 125° C. is required to secure acceptable reaction rates, particularly in making products of high molecular weight. On the other hand, above 140° C. there is a tendency for objectionable discoloration of the product. Since the condensation, once underway, is highly exothermic, cooling can be applied with advantage. Even with strong cooling, it is important to introduce the olefin oxide mixture gradually to avoid overheating. In general, the operating pressure produced by the added olefin oxide mixture should be held in the range of 10 to 50 pounds per square inch gage, with pressures over 70 pounds being carefully avoided to prevent the reaction from getting out of control. Vigorous agitation is desirable to maintain a good dispersion of the catalyst and uniform reaction rates throughout the mass.

The course of the condensation can be followed roughly by metering in the olefin oxide mixture, and more accurately by withdrawing a portion of the condensate and subjecting it to some form of rapid analysis. For control purposes, a viscosity measurement by the falling-ball method is adequate, the sample being first neutralized with carbon dioxide, topped to remove volatile matter by vacuum fractionation to 120° C. at 20 millimeters of mercury absolute pressure, and the residue clarified by filtration. If desired, the molecular weight of the topped material may also be determined, preferably by measuring the acetyl value and reckoning three free hydroxyl groups per molecule. When the desired viscosity or molecular weight is attained, addition of the olefin oxide mixture is stopped. Agitation at a reaction temperature is then continued until the pressure falls to a low value, after which the product may be cooled, removed and worked up.

The preferred method of working up the cooled reaction product, when the catalyst used is an alkali, is to dilute it with water to reduce the viscosity somewhat, 5 to 10 per cent water by weight usually being sufficient. The diluted material is then passed in sequence at room temperature through a sufficient bed of a cation-exchange resin in acid form to remove the alkaline catalyst. The most convenient resin is the sulfonated styrene-divinyl benzene copolymer described in U. S. Patent 2,366,007 and available commercially in bead form. If the effluent from the cation-exchange bed is acidic, it may be returned to neutrality by passing it through a bed of a weakly basic anion-exchange resin. Following removal of the catalyst, the diluted reaction product is heated at reduced pressure under fractionating reflux to distill off water and volatile matter, mainly unreacted olefin oxides. For instance, at an absolute pressure of 20 millimeters of mercury, heating at 120° C. until no more material distills will result in a material meeting all volatility specifications for hydraulic brake fluid ingredients.

In an alternative method of working up the cooled reaction product, it may be diluted with 10 to 20 per cent of a water-immiscible volatile solvent, such as benzene, toluene, or carbon tetrachloride. The diluted material is then neutralized with carbon dioxide or acetic acid and washed several times with water at a temperature above 80° C., most preferably at 120° C. or more, even if pressure is required to maintain the liquid phase. The high temperature is important to reduce solubility of the product in the water. The washed material is then topped under vacuum as already described, and the residue filtered, if necessary to clarify it.

The following examples will further illustrate the invention:

EXAMPLE I

A charge of commercial 95 per cent glycerine was mixed with potassium hydroxide (corresponding to 0.2 per cent by weight of total reactants), and the mixture was introduced into a stirring autoclave and heated to 125° C. An equimolecular mixture of ethylene oxide and propylene oxide was then gradually pumped into the autoclave over a period of several hours at such a rate that the pressure stayed in the range of 10 to 50 pounds per square inch gage and the temperature in the range of 125° to 140° C. Addition of the oxide mixture was stopped when 19 mols of oxide had been added per mol of glycerol. The mixture was then worked up by the preferred procedure described above. The resulting volatile-free condensate, which was a clear colorless thick liquid, had a specific gravity of 1.0685 (25°/25°) and a refractive index $n_D^{25°}$ of 1.4600. The viscosity at 100° F. was 98.9 centistokes and at 210° F. was 12.9 centistokes. The acetyl value corresponded to a hydroxyl content of about 5.17 per cent, corresponding to an average molecular weight of about 990.

EXAMPLE II

The general procedure of Example I was followed in a series of preparations using relative proportions of ethylene oxide to propylene oxide from 1:2 to 3:2 and various relative proportions of oxide mixture to glycerol, all as shown in the accompanying table. Each condensate, after neutralization and devolatilization, was tested to determine specific gravity (25°/25°), refractive index $n_D^{25°}$, and viscosity at 100° F. and at 210° F. in centistokes. These values are given for each condensate in the table.

All of the products were infinitely miscible with water at room temperature. However, the water solubility of each condensate decreased with increasing temperature.

On heating solutions of the individual condensates in water, each mixture separated into two immiscible liquid phases at a definite sharp temperature characteristic of the condensate and the proportion of water. These critical solution temperatures were measured for solutions of the various condensates in water in concentrations of 10 per cent by weight, the results being given in the table.

Table

| Mole Ratio | | Specific Gravity | Refractive Index | Viscosity | | Solution Temp. (° C.) |
| --- | --- | --- | --- | --- | --- | --- |
| Ethylene oxide: Propylene oxide | Oxides: Glycerol | | | 100° F. | 210° F. | |
| 1 | 8 | 1.093 | 1.468 | 111.5 | 9.8 | (1) |
| 1 | 26 | (1) | (1) | 100.9 | 13.8 | 83 |
| 1 | 69 | (1) | (1) | 181.6 | 27.6 | 58 |
| 1 | 72 | 1.055 | 1.4595 | 200.3 | 31.5 | 55 |
| 1 | 264 | (1) | (1) | 489.3 | 77.6 | (1) |
| 1 | 300 | (1) | (1) | 593 | 91.6 | 44 |
| 0.5 | 10.6 | 1.052 | 1.4570 | 89.3 | 11.8 | 67 |
| 0.5 | 14.6 | 1.042 | 1.4565 | 122.1 | 18.2 | 46 |
| 1.5 | 77 | (1) | (1) | 213.4 | 34.1 | (1) |
| 1.5 | 100 | (1) | (1) | 265.4 | 42.3 | 68 |

[1] Not measured.

The trihydroxy mixed poly(oxy-ethylene oxy-1,2-propylene) glycerol ethers prepared as described may be compounded into hydraulic brake fluids according to principles known in the art. Hydraulic brake fluids for automotive use are primarily mixtures of a viscous nearly non-volatile lubricant and a solvent which acts as a solubilizer and thinner. A glycol is preferably also included to reduce rubber swelling.

In formulating such brake fluids using a condensate according to the present invention, the latter acts primarily as the non-volatile lubricating constituent. In this function, there are realized the advantages previously mentioned. In general, the condensate should represent from about 15 to about 25 per cent by weight of the final hydraulic fluid, the balance being solvent and glycol, if any.

What is claimed is:

1. A mixture of trihydroxy mixed poly(oxyethylene-oxy-1,2-propylene) ethers of glycerol in which the oxyethylene groups represent from about 20 to about 80 mol per cent of the total oxyalkylene groups, and in which there is an average of at least 8 oxyalkylene groups per glycerol nucleus.

2. A mixture of trihydroxy mixed poly(oxyethylene-oxy-1,2-propylene) ethers of glycerol in which the oxyethylene groups represent from 33 to 60 per cent of the total oxyalkylene groups, and in which the said mixture has an average molecular weight by acetyl value of at least 850.

3. A mixture of trihydroxy mixed poly(oxyethylene-oxy-1,2-propylene) ethers of glycerol in which the oxyethylene groups represent about 50 mol per cent of the total oxyalkylene groups, and in which there is an average of at least 50 oxyalkylene groups per glycerol nucleus.

4. A mixture of trihydroxy mixed poly(oxyethylene-oxy-1,2-propylene) ethers of glycerol in which the oxyethylene groups represent about 50 mol per cent of the total oxyalkylene groups, and in which there is an average of approximately 72 oxyalkylene groups per glycerol nucleus such that the mixture has a viscosity at 100° F. of about 200 centistokes.

5. A mixture of trihydroxy mixed poly(oxyethylene-oxy-1,2-propylene) ethers of glycerol in which the oxyethylene groups represent from 20 to about 80 mol per cent of the total oxyalkylene groups, and in which there is an average of at least 15 oxyalkylene groups per glycerol nucleus, said mixture having been prepared by reacting a mixture of ethylene oxide and propylene oxide with glycerol.

6. A mixture of trihydroxy mixed poly(oxyethylene-oxy-1,2-propylene) ethers of glycerol in which the oxyethylene groups represent from 20 to 80 mol per cent of the total oxyalkylene groups, and in which the said mixture has an average molecular weight by acetyl value from 500 to 6000, said mixture having been prepared by reacting a mixture of ethylene oxide and propylene oxide with glycerol.

7. A mixture of trihydroxy mixed poly(oxyethylene-oxy-1,2-propylene) ethers of glycerol in which the oxyethylene groups represent from 33 to 60 mol per cent of the total oxyalkylene groups, and in which there is an average of from 15 to 300 oxyalkylene groups per glycerol nucleus, said mixture having been prepared by reacting a mixture of ethylene oxide and propylene oxide with glycerol.

References Cited in the file of this patent

UNITED STATES PATENTS

| | | |
| --- | --- | --- |
| 1,922,459 | Schmidt et al. | Aug. 15, 1933 |
| 2,233,382 | De Groote et al. | Feb. 25, 1941 |
| 2,236,919 | Reynhart | Apr. 1, 1941 |
| 2,327,053 | Marple et al. | Aug. 17, 1943 |
| 2,481,278 | Ballard et al. | Sept. 6, 1949 |
| 2,520,733 | Morris et al. | Aug. 29, 1950 |

FOREIGN PATENTS

| | | |
| --- | --- | --- |
| 616,256 | Great Britain | Jan. 19, 1949 |

OTHER REFERENCES

The Amberlites, Resinous Products & Chemicals Co., page 9 (1942), Philadelphia, Pa.